United States Patent
Dworak et al.

(10) Patent No.: US 11,743,121 B1
(45) Date of Patent: Aug. 29, 2023

(54) METHOD AND SYSTEM FOR COLLECTION OF VENDOR-AGNOSTIC STATE AND CONFIGURATION INFORMATION FROM NETWORK DEVICES

(71) Applicant: Microsoft Technology Licensing, LLC, Redmond, WA (US)

(72) Inventors: Bartlomiej A. Dworak, Bellevue, WA (US); Naveenkumar Iyappan, Redmond, WA (US); Taehyun Kwon, Bellevue, WA (US); Manikandan Balasubramanian, Snohomish, WA (US); Michael Lu, Redmond, WA (US); Dipanjan Nag, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/807,609

(22) Filed: Jun. 17, 2022

(51) Int. Cl.
- G06F 15/177 (2006.01)
- H04L 41/082 (2022.01)
- G06F 9/54 (2006.01)
- H04L 41/0866 (2022.01)

(52) U.S. Cl.
CPC ............ H04L 41/082 (2013.01); G06F 9/547 (2013.01); H04L 41/0866 (2013.01)

(58) Field of Classification Search
CPC .... H04L 41/082; H04L 41/0866; G06F 9/547
See application file for complete search history.

(56) References Cited

U.S. PATENT DOCUMENTS

| | | | | |
|---|---|---|---|---|
| 6,766,364 B2 * | 7/2004 | Moyer | ................ | H04L 41/5054 370/352 |
| 10,742,501 B1 * | 8/2020 | Pianigiani | ............. | H04L 41/082 |
| 10,938,660 B1 * | 3/2021 | Kapur | ................. | H04L 41/0266 |
| 2005/0091068 A1 * | 4/2005 | Ramamoorthy | ...... | H04L 41/022 709/203 |
| 2021/0271565 A1 * | 9/2021 | Bhavanarushi | ..... | G06F 11/1464 |

FOREIGN PATENT DOCUMENTS

CN            104471896 A   *   3/2015           H04L 41/022

OTHER PUBLICATIONS

Boone, Rob, "Injecting Intelligence into Microsoft's Internal Network with Microsoft Azure", Retrieved from: https://www.microsoft.com/insidetrack/blog/injecting-intelligence-into-microsofts-internal-network-with-microsoft-azure/, May 18, 2020, 8 Pages.

* cited by examiner

*Primary Examiner* — Richard G Keehn
(74) *Attorney, Agent, or Firm* — ArentFox Schiff LLP (57) ABSTRACT

Example aspects include techniques for collection of vendor-agnostic state and configuration information from network devices. These techniques may include receiving first device information from a network device of a network, the first device information including configuration information or state information in a vendor specific format and parsing, via a template associated with the vendor specific format, the first device information to generate parsed device information. In addition, the techniques may include generating, based on a vendor-agnostic model and the parsed device information, second device information in a vendor-agnostic format, and generating a network representation including the second device information. Further, the techniques may include dynamically generating an application programming interface (API) for accessing the network representation of the second device information via an API request.

20 Claims, 4 Drawing Sheets

METHOD AND SYSTEM FOR COLLECTION OF VENDOR-AGNOSTIC STATE AND CONFIGURATION INFORMATION FROM NETWORK DEVICES

BACKGROUND

Typically, a computer network may include a plurality of network devices. Further, many of the network devices may be manufactured by different vendors or utilize operating systems developed by different vendors. As such, different vendor commands must be used to retrieve device information (e.g., telemetry information, configuration information, and/or state information) from the network devices of the computer network and the network devices may return device information according to different vendor formats in response to device information requests. Accordingly, devices that endeavor to provide access to network device information from the various types of network devices and/or consume network device information from the various types of network devices must be configured to utilize various vendor commands and vendor formats, which can be cumbersome, inefficient, and complicate the addition of new network devices to a computer network.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a method including: receiving first device information from a network device of a network, the first device information including configuration information or the state information in a vendor specific format; parsing, via a template associated with the vendor specific format, the first device information to generate parsed device information; generating, based on a vendor-agnostic model and the parsed device information, second device information in a vendor-agnostic format; generating a network representation including the second device information; and dynamically generating an application programming interface (API) for accessing the network representation of the second device information via an API request.

In some aspects, the techniques described herein relate to a non-transitory computer-readable device having instructions thereon that, when executed by at least one computing device, cause the at least one computing device to perform operations including: receiving first device information from a network device of a network, the first device information including configuration information or the state information in a vendor specific format; parsing, via a template associated with the vendor specific format, the first device information to generate parsed device information; generating, based on a vendor-agnostic model and the parsed device information, second device information in a vendor-agnostic format; generating a network representation including the second device information; and dynamically generating an application programming interface (API) for accessing the network representation of the second device information via an API request.

In some aspects, the techniques described herein relate to a system including: a memory storing instructions thereon; and at least one processor coupled with the memory and configured by the instructions to: receive first device information from a network device of a network, the first device information including configuration information or the state information in a vendor specific format; parse, via a template associated with the vendor specific format, the first device information to generate parsed device information; generate, based on a vendor-agnostic model and the parsed device information, second device information in a vendor-agnostic format; generate a network representation including the second device information; and dynamically generate an application programming interface (API) for accessing the network representation of the second device information via an API request.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for implementing vendor-agnostic state and configuration collection from network devices. Many modern networking systems may include applications that consume network device information. For example, a computer network may include a monitoring application that monitors the state of a computer network and provides alerts to network operator devices in response to changes in the state of the computer network. In order to monitor the computer network, a monitoring application may transmit messages requesting network information to network devices within the computer network and/or receive messages including network information from the network devices within the computer network. However, most networking devices are configured to transmit network information in response to vendor-specific commands systems. Moreover, the network information will be communicated in a vendor-specific format.

Aspects of the present disclosure provide collection of vendor-specific device information, organization of the vendor-specific information into a vendor-agnostic representation, and utilization of the vendor-agnostic representation to provide standardized network information to network information consumers. As such, the network information consumers (e.g., a monitoring application) do not have to be configured to interact with multiple vendors and updated each time a network device associated with a new vendor is added to the computer network.

In particular, a network information platform may be configured to provide vendor-agnostic device information via a dynamically generated API. The network information platform may collect vendor-specific information from network devices associated with different vendors. Further, the network information platform may parse the vendor-specific device information using vendor specific templates and format the parsed device information using models to generate vendor-agnostic device information. Additionally, the network information platform may generate a graph representation of the network using the vendor-agnostic information, and provide network information from the graph representation to network information consumers via a dynamically generated API. Accordingly, the present techniques simplify network information consumption by reducing the negative implications of processing vendor-specific data generated by heterogenous network devices within the same computer network.

Illustrative Environment

Figure 1:
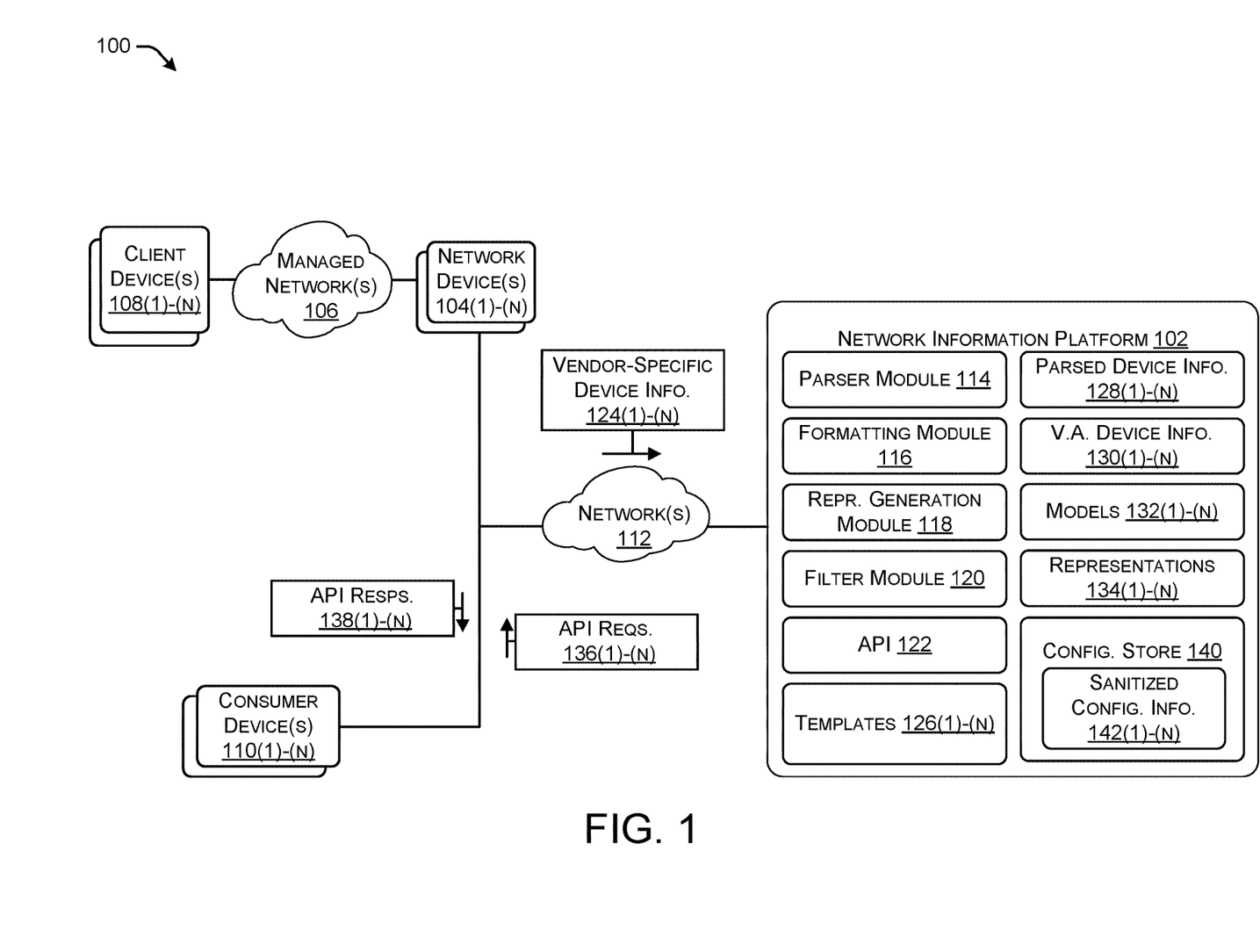
FIG. 1 illustrates an example architecture of a network management system, in accordance with some aspects of the present disclosure.

FIG. 1 is a diagram showing an example architecture of a computer network, in accordance with some aspects of the present disclosure. As illustrated in FIG. 1, the computing network 100 may include a network information platform 102, a plurality of network devices 104(1)-(*n*) configured to implement one or more managed networks 106(1)-(*n*) employed by one or more client devices 108(1)-(*n*), one or more consumer devices 110(1)-(*n*) configured to consume (e.g., collect, analyze, monitor, and/or process) network information associated with the network device 104(1)-(*n*), and one or more networks 112(1)-(*n*). The plurality of network devices 104(1)-(*n*) may be layer 2 devices and/or layer 3 devices of the open systems interconnection (OSI) model configured to provide the one or more managed networks 106(1)-(*n*). Further, the one or more managed networks 106(1)-(*n*) and the one or more networks 112(1)-(*n*) may comprise any one or combination of multiple different types of networks, such as cellular networks, wireless networks, local area networks (LANs), wide area networks (WANs), personal area networks (PANs), the Internet, or any other type of network configured to communicate information between computing devices (e.g., the network information platform 102, the one or more client devices 108(1)-(*n*), and the one or more consumer devices 110(1)-(*n*)). Some examples of the client devices 104(1)-(*n*) and the consumer devices 110(1)-(*n*) include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc.

In some aspects, the network information platform 102 may be a multi-tenant environment that provides the consumer devices 104(1)-(*n*) with distributed storage and access to software, services, files, and/or data via the one or more network(s) 112(1)-(*n*). In a multi-tenant environment, one or more system resources of the network information platform 102 are shared among tenants but individual data associated with each tenant is logically separated. For example, the network information platform 102 may be a cloud computing device, and offer network information collection as a service. Further, in some aspects, a consumer device 110 may include one or more applications configured to interface with the network information platform 102 and/or one or more cloud applications deployed on the network information platform 102.

The network information platform 102 may include a parser module 114, a formatting module 116, a representation generation module 118, a filter module 120, and an application programming interface (API) 122. The parser module 114 may request vendor-specific device information 124(1)-(*n*) from the network devices 104(1)-(*n*). For example, the parser module 114 may request first vendor-specific device information 124(1) from a first network device 104(1), nth vendor-specific device information 124(*n*) from a nth network device 104(*n*), and so forth. As another example, the parser module 114 may request first vendor-specific device information 124(1) from a first network device 104(1) and nth vendor-specific device information 124(*n*) from the first network device 104(1) at a later point in time. In some aspects, the vendor-specific device information 124(1)-(*n*) may include configuration information and state information of the network devices 104(1)-(*n*). Further, in some aspects, the vendor-specific device information 124(1)-(*n*) may be command line interface (CLI) output from the network devices 104(1)-(*n*). For example, the vendor-specific device information 124(1) may be CLI output corresponding to a particular CLI command that returns particular type of state information and/or configuration information. Additionally, each instance of vendor-specific device information 124 may be in a vendor specific format associated with a manufacturer of the network device 104 and/or an operating system of the network device 104.

Upon receipt of the vendor-specific device information 124(1)-(*n*), the parser module 114 may parse the vendor-specific device information 124(1)-(*n*) using one or more templates 126(1)-(*n*) to generate parsed device information 128(1)-(*n*). For example, the parser module 114 identify a template 126(1) associated with device vendor and/or device model of the first network device 104(1), and apply the template 126(1) to the first vendor-specific device information 124(1) received from the first network device 104(1) to generate first parsed device information 128(1). Each template 126 may be defined to process uniquely structured text input. For instance, the first template 126(1) may be defined to process a first vendor-specific format. In addition, the first template 126(1) may be used to process a particular type of device information in the first vendor-specific format.

In some aspects, the parsed device information 128(1)-(*n*) may be a JavaScript object notation (JSON) representation of the vendor-specific device information 124(1)-(*n*). For example, the first parsed device information 128(1) may include a JSON representation of at least a portion of the parameter names and the parameter values of the first vendor-specific device information 124(1). Further, in some aspects, the parser module 114 may include a template-based state machine configured to parse semi-formatted text (i.e., the vendor-specific device information 124(1)-(*n*)). Additionally, the template-based state machine may generate the parsed device information 128(1)-(*n*) based on the vendor-specific device information 124(1)-(*n*) and the templates 126(1)-(*n*).

The formatting module 116 may generate vendor-agnostic device information 130(1)-(*n*) by applying one or more models 132(1)-(*n*) to the parsed device information 128(1)-(*n*). Each model 132 may correspond to a particular type of configuration information and/or state information. A model 132 may correspond to at least one of device attributes, version information, clock information, connected device information, protocol information, gateway information, extended service set identifier, hardware information, inventory information, interface information, internet protocol (IP) version 4 virtual routing and forwarding, IP version 6 virtual routing and forwarding, virtual router redundancy protocol information, syslocation information, syscontact information, content addressable memory information, discovery protocol information, intermediate system to intermediate system neighbor information, link layer discovery protocol, border gateway protocol information, open shortest path first information, transceiver information, module information, platform information, central processing unit, and address resolution protocol information. In some aspects, the formatting module 116 may determine the model 132 associated with the parsed device information 128, and apply the model 132 to the parsed device information 128 to generate vendor-agnostic device information 130 in a vendor-agnostic format defined by the models 132(1)-(*n*). For example, application of a model 132 corresponding to clock information may be applied to first parsed device information 128(1) in a first vendor-specific format and second parsed device information 128(2) in a second vendor-specific format that differs from the first vendor-specific format to generate first and second vendor-agnostic device information 130 in a same vendor-agnostic format. In some aspects, having a shared vendor-agnostic format may correspond to having the same parameter names for the configuration information and/or the state information and/or having the same set of possible parameter values for the configuration information and/or the state information. Further, in some aspects, applying a model 132 to parsed device information 128 may include converting a parameter name or parameter value from vendor-specific format to the vendor-agnostic format based on a mapping between the vendor-specific format and the vendor-agnostic format defined within the model 132.

The representation generation module 118 may generate representations 134(1)-(*n*) of the configuration information and the state information of the network devices 104(1)-(*n*) and the managed networks 106(1)-(*n*) based on the vendor-agnostic device information 130(1)-(*n*). For example, the representation generation module 118 may generate a graph representation 134(1) of the configuration information and the state information of one of more related network devices 104 (e.g., one or more network devices 104 implementing a particular managed network 106). Further, the configuration information and the state information may be represented as nodes and edges of the representation 134(1), and the representation may be traversed to retrieve configuration and/or state information in response to a query. Additionally, once a representation 134 is generated, the representation generation module 118 may update the representation 134 in response to the receipt of additional vendor-agnostic device information 130 associated with the representation 134 by the representation generation module 118. For example, an administrator device 110(1) may update the configuration of the network device 104(1), the representation generation module 118 may receive vendor-agnostic device information 130(2) including the updated configuration, and the representation generation module 118 may update the representation 134(1) associated with the network device 104(1) based on the vendor-agnostic device information 130(2). As another example, if the state of a connection between the network device 104(1) and the network device 104(2) changes, the representation generation module 118 may receive vendor-agnostic device information 130(3) including the updated state, and the representation generation module 118 may update the representations 134(1)-(2) associated with the network device 104(1) and the network device 104(2) based on the vendor-agnostic device information 130(3).

Further, in some aspects, the filter module 120 may determine the vendor-agnostic device information 130(1)-(*n*) that should be used to generate the representations 134(1)-(*n*). For example, in response to receipt of vendor-agnostic device information 130(1) including configuration and/or state information for the first network device 104(1) associated with the first representation 134(1), the filter module 120 may determine whether the configuration information and/or the state information of the vendor-agnostic device information 130(1) is already represented within the first representation 134(1). If the configuration information and/or the state information of the vendor-agnostic device information 130(1) is not represented within the first representation 134(1), the representation generation module 118 may update the representation 134(1). In some aspects, employing the filter module 120 provides computational, speed, and load benefits by preventing unnecessary updates to the representations 132(1)-(*n*).

Further, the representation generation module 118 may dynamically generate an API 122 for accessing the representations 134(1)-(*n*) via API requests 136(1)-(*n*) and API responses 138(1)-(*n*). In some aspect, the one or more models 132 provide for the dynamic generation of the API 122 by establishing the API endpoints for the API 122 and standardizing the scheme for retrieving data from the representations 132(1)-(*n*), as described in detail with respect to FIG. 2. For example, the representation generation module 118 may dynamically generate a representational state transfer (REST) API, and the API 122 may be configured to receive hypertext transfer protocol (HTTP) requests (e.g., GET requests) from the consumer devices 110(1)-(*n*) and transmit HTTP responses to the consumer devices 110(1)-(*n*). In some aspects, an API request 136 may include an identifier of one or more resources of a managed network 106 and/or network device 104. For example, the identifier may be a full qualified domain name of an attribute, relationship, and/or setting of one or more network devices 104. Further, the API 122 may identify the vendor-agnostic device information 130 within a representation based on the identifier, and transmit the identified vendor-agnostic device information 130 to the requesting consumer device 110 via an API response 138. In some aspects, an API request 136 may indicate that a real-time response is requested for configuration information and/or state information for the network device 104(1). In response, the network information platform may request the vendor-specific device information 124 from the network device 104(1), the parser module 114 may determine parsed device information 128, the formatting module 116 may determine vendor-agnostic device information 130, and the API 122 may transmit an API response 138 including the real-time vendor-agnostic device information 130. Additionally, the real-time vendor-agnostic device information 130 may be used to update the representation 134(1) corresponding to the network device 104 (1). Further, in some aspects, the network information platform 102 may periodically request vendor-specific device information 124(1)-(n) from the network devices 104(1)-(n) in order to ensure the that the representations 134(1)-(n) accurately reflect the managed networks 106(1)-(n), respectively.

In addition, as illustrated in FIG. 1, in some aspects, the network information platform 102 may include a configuration store 140 for storing sanitized copies of the vendor-specific device information 124(1)-(n). For example, the network information platform 102 may receive the vendor-specific device information 124(1)-(n), remove sensitive data (e.g., credentials) from the vendor-specific device information 124(1)-(n) to generate sanitized configuration information 142(1)-(n), and store the sanitized configuration information 142(1)-(n) within the configuration store 140. In some aspects, the sanitized configuration information 142(1)-(n) may be used for backup, recovery, auditing, and other data analysis purposes.

Figure 2:
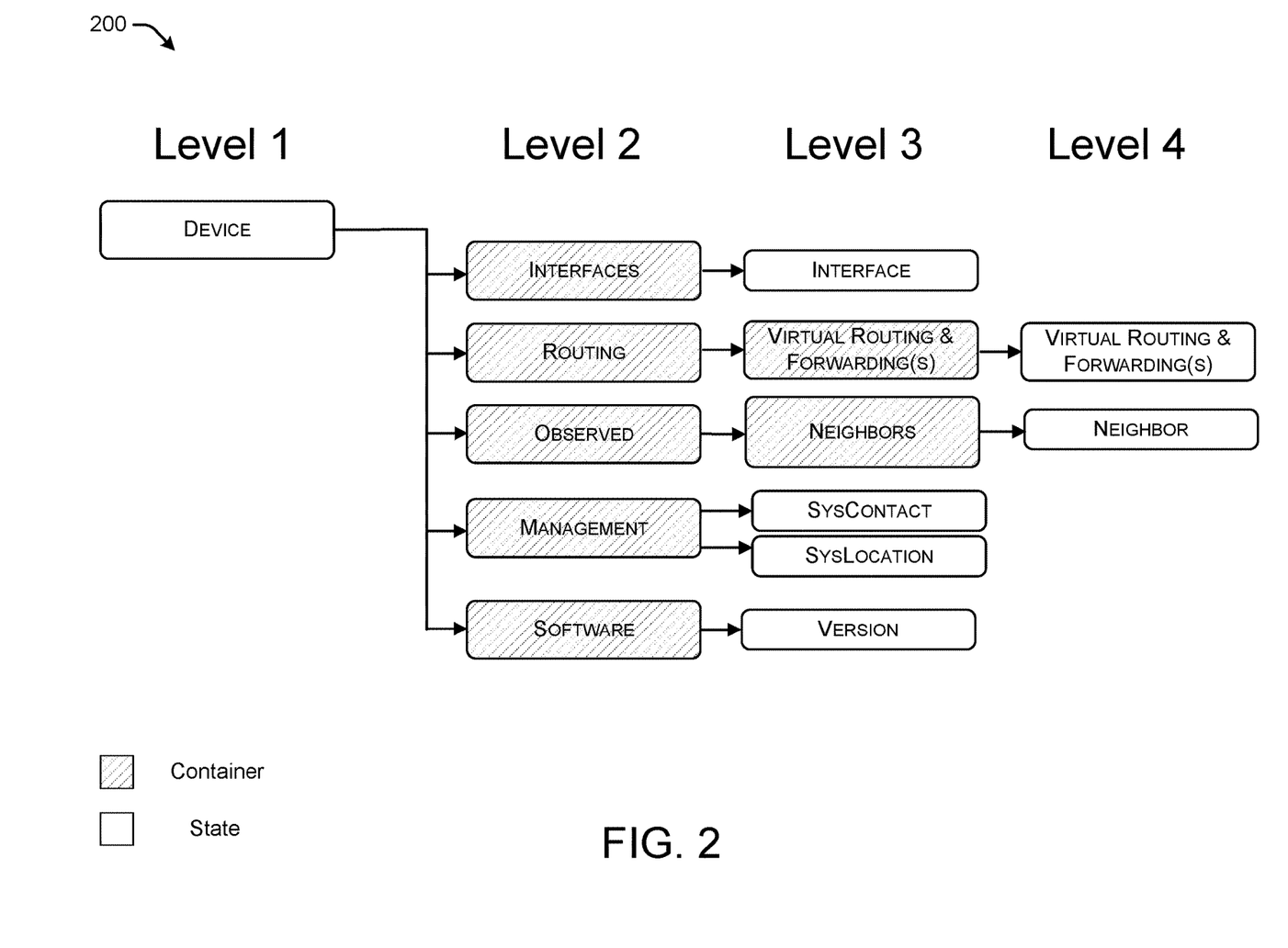
FIG. 2 is a diagram illustrating an example network data model implemented using vendor-agnostic state and configuration information, in accordance with some aspects of the present disclosure.

FIG. 2 is a diagram illustrating an example network data model implemented using vendor-agnostic state and configuration information, in accordance with some aspects of the present disclosure. As described herein, the network information platform 102 may collect network data (e.g., the vendor-agnostic device information 120(1)-(n)) from the network devices 104(1)-(n) and provide access to the network data via the API 122. In some aspects, the API 122 may make the network data available in accordance with the network data model 200.

As shown in FIG. 2, the API 122 may make the network data available at four levels. Further, the schema of the network data model 200 may be used to format network device information requests. In particular, the API requests 136(1)-(n) may include resource identifiers identifying the subject of the API request 136(1)-(n). For example, the API request 136(1) may include the fully qualified domain name (FQDN) resource identifier "/firstnetworkdevice/observed/ neighbors" in accordance with the schema of the network data model 200. In response to API request 136(1), the API 122 may transmit an API response 138(1) including the neighbors of the first network device 104(1). Consequently, an application running on an consumer device 110 may use the network data model 200 to access network information for a diverse group of network devices 104(1)-(n) via the schema of network data model 200 without having to use the vendor-specific commands for each type of network device 104 among the plurality of network devices 104(1)-(n).

Example Processes

Figure 3:
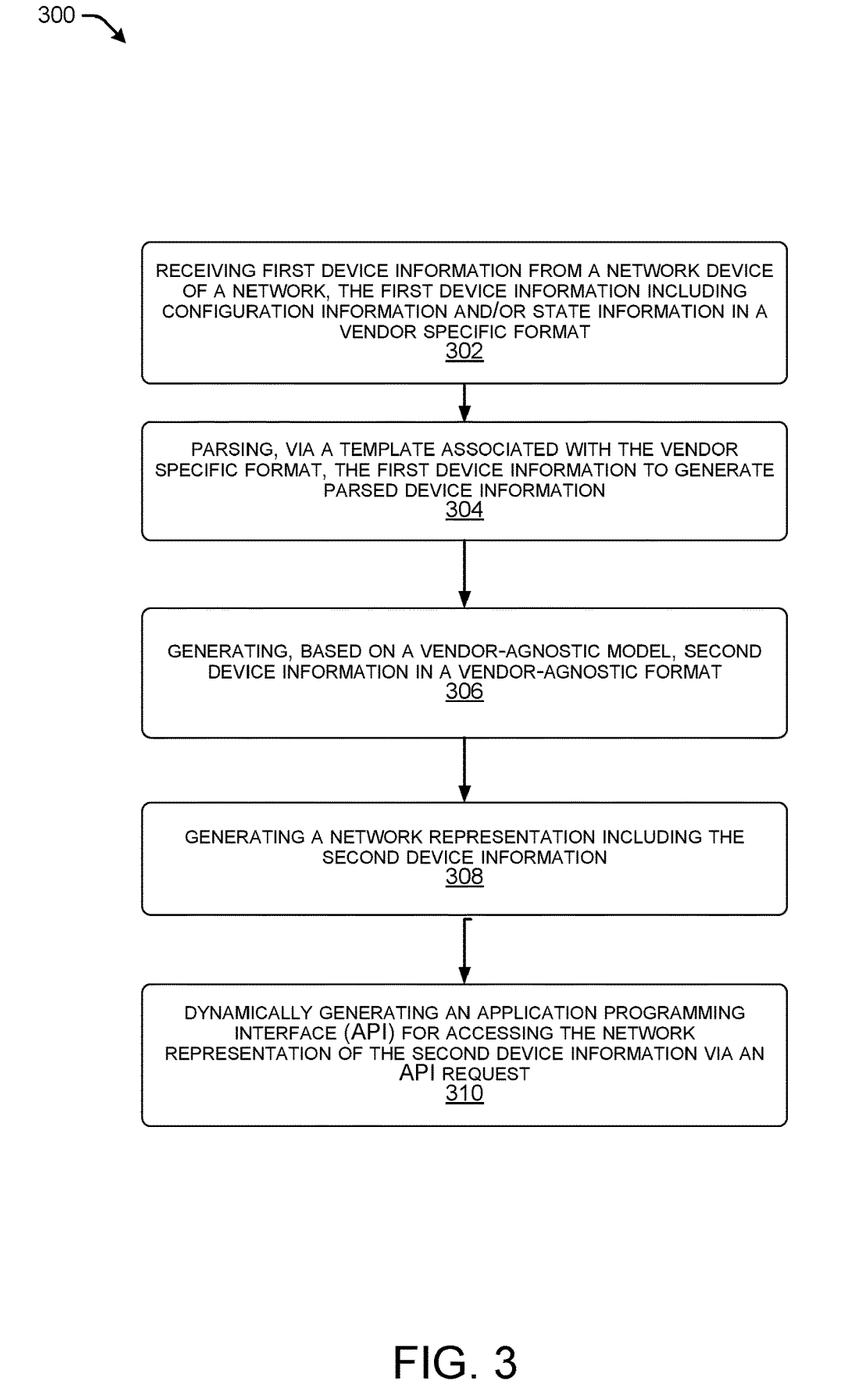
FIG. 3 is a flow diagram illustrating an example method for implementing collection of vendor-agnostic state and configuration information from network devices, in accordance with some aspects of the present disclosure.

FIG. 3 is a flow diagram illustrating an example method 300 for implementing vendor-agnostic state and configuration collection from network devices, in accordance with some aspects of the present disclosure. The method 300 may be performed by one or more components of the network information platform 102, the computing device 400, or any device/component described herein according to the techniques described with reference to the previous figures.

At block 302, the method 300 may include receiving first device information from a network device of a network, the first device information including configuration information or the state information in a vendor specific format. For example, the parser module 114 may request the vendor-specific device information 124(1) from the network devices 104(1), and the CLI of the network device 104(1) may transmit the vendor-specific device information 124(1) to the parser module 114 in response to the request. In some aspects, the request may be for a particular type of configuration and/or state information. For example, the request may be for internet protocol (IP) configuration of the network device 104(1), and include an identifier of IP configuration information (e.g., a CLI command that returns IP configuration information). Further, the vendor-specific device information 124(1) may include a parameter identifier "IP-V4-Enabled" and a parameter value "true." Accordingly, the vendor-specific device information 124(1) may indicate that internet protocol (IP) version 4 is enabled at the network device 104(1).

In some aspects, the parser module 114 may request the vendor-specific device information 124(1) based on a schedule or in response to a triggering event. Additionally, or alternatively, the CLI of the network device 104(1) may transmit the vendor-specific device information 124(1) to the parser module 114 in accordance with a schedule or in response to a triggering event detected by the network device 104(1).

Figure 4:
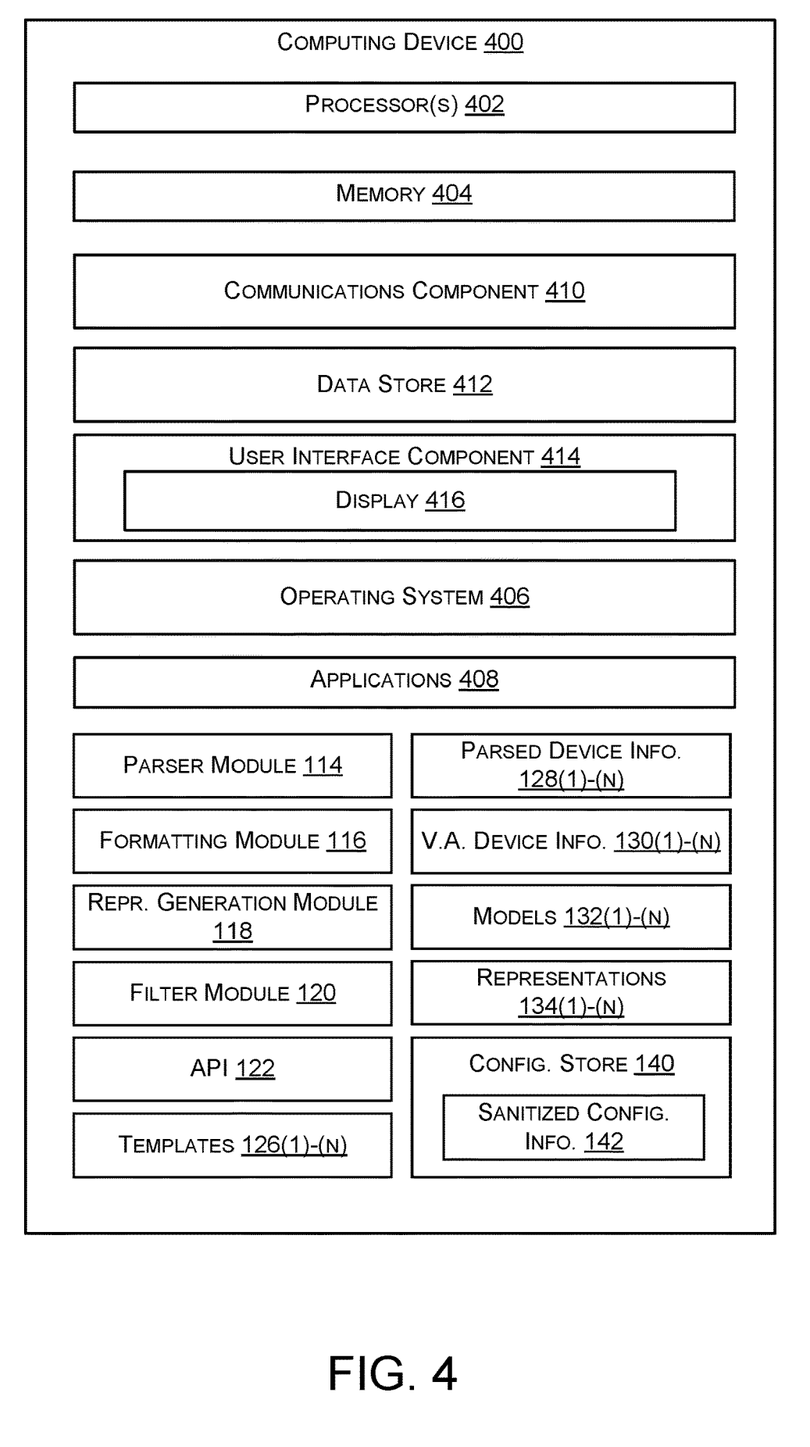
FIG. 4 is a block diagram illustrating an example of a hardware implementation for a computing device(s), in accordance with some aspects of the present disclosure.

Accordingly, the network information platform 102, the computing device 400, and/or the processor 402 executing the parser module 114 may provide means for receiving first device information from a network device of a network, the first device information including configuration information or the state information in a vendor specific format.

At block 304, the method 300 may include parsing, via a template associated with the vendor specific format, the first device information to generate parsed device information. For example, the parser module 114 may identify a template 126(1) associated with device vendor and/or device model of the first network device 104(1), and apply the template to the first vendor-specific device information 124(1) received from the first network device 104(1) to generate first parsed device information 128(1). For instance, the parser module 114 may generate the first parsed device information 128(1) including a JSON object having the following key and value pair: "IP-V4-Enabled:true" based on application of the template 126(1) to the vendor-specific device information 124 (1).

Accordingly, the network information platform 102, the computing device 400, and/or the processor 402 executing the parser module 114 may provide means for parsing, via a template associated with the vendor specific format, the first device information to generate parsed device information.

At block 306, the method 300 may include generating, based on a vendor-agnostic model and the parsed device information, second device information in a vendor-agnostic format. For example, the formatting module 116 may determine the model 132(1) is associated with IP configuration information, and apply the model 132 to the parsed device information 128 to generate vendor-agnostic device information 130(1) in a vendor-agnostic format defined by the model 132(1). For instance, the vendor-agnostic device information 130(1) may include a JSON object having the following key and value pair: "IP-version4-isEnabled:true" which will be used for network devices 104 that have IP version 4 enabled.

Accordingly, the network information platform 102, the computing device 400, and/or the processor 402 executing the formatting module 116 may provide means for generating, based on a vendor-agnostic model and the parsed device information, second device information in a vendor-agnostic format.

At block 308, the method 300 may include generating a network representation including the second device information. For example, the representation generation module 118 may generate elements (e.g., node and edges) within a graph representation 134(1) of the vendor-agnostic device information 130(1) that indicate that IP version 4 is enabled at the network device 104(1).

Accordingly, the network information platform 102, the computing device 400, and/or the processor 402 executing representation generation module 118 may provide means for generating a network representation including the second device information.

At block 310, the method 300 may include dynamically generating an API for accessing the network representation of the second device information via an API request. For example, the representation generation module 118 may dynamically generate an API 122 for accessing the representations 134(1). Further, an administrator device 110(1) may transmit an API request 136(1) for configuration information and/or state information of the network device 104(1) (e.g., the IP version information of the network device 104(1)) to the API 122, and the API 122 may send an API response 138(1) identifying that IP version 4 is enabled for network device 104(1). In some aspects, the API request 136(1) may include a resource identifier identifying the state of IP version 4 for the network device 104(1). Further, the same resource identifier may be used for other network devices 104(2)-(*n*) even though the network devices 104(1)-(*n*) may have different vendors based on the method 300. In addition, in some aspects, the API response may match the format set by the model 132(1) used to generate the corresponding vendor-agnostic device information 130(1).

Accordingly, the network information platform 102, the computing device 400, and/or the processor 402 executing representation generation module 118 may provide means for dynamically generating an API for accessing the network representation of the second device information via an API request.

In some aspects, the techniques described herein relate to a method, further including: receiving the API request from a client device, the API request including a resource identifier identifying a model resource associated with the network device or the network; identifying the second device information within the network representation based on the resource identifier; and transmitting an API response to the client device, the API response including the configuration information or the state information.

In some aspects, the techniques described herein relate to a method, wherein receiving the first device information from the network device of the network includes receiving command line interface (CLI) output from the network device.

In some aspects, the techniques described herein relate to a method, wherein generating the network representation including the second device information includes: identifying a portion of the second device information that has not been represented within the network representation; and updating the network representation to include the portion of the second device information.

In some aspects, the techniques described herein relate to a method, wherein generating the network representation including the second device information includes: updating or generating a graph representation of the network, the graph representation including one or more graph nodes or graph edges corresponding to the configuration information or the state information.

In some aspects, the techniques described herein relate to a method, wherein the API is a representational state transfer (REST) API, and the API request is a hypertext transfer protocol get request.

In some aspects, the techniques described herein relate to a method, wherein the network device is a layer 2 device or layer 3 device.

While the operations are described as being implemented by one or more computing devices, in other examples various systems of computing devices may be employed. For instance, a system of multiple devices may be used to perform any of the operations noted above in conjunction with each other.

Illustrative Computing Device

Referring now to FIG. 4, an example of a computing device(s) 400 (e.g., the network information platform 102). In one example, the computing device(s) 400 includes the processor 402 for carrying out processing functions associated with one or more of components and functions described herein. The processor 402 can include a single or multiple set of processors or multi-core processors. Moreover, the processor 402 may be implemented as an integrated processing system and/or a distributed processing system. In an example, the processor 402 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 402 may include other processing components such as one or more arithmetic logic units (ALUs), registers, or control units.

In an example, the computing device 400 also includes memory 404 for storing instructions executable by the processor 402 for carrying out the functions described herein. The memory 404 may be configured for storing data and/or computer-executable instructions defining and/or associated with the parser module 114, the formatting module 116, the representation generation module 118, the filter module 120, and the API 122, the vendor-specific device information 124, the templates 126(1)-(*n*), the parsed device information 128(1)-(*n*), the vendor-agnostic device information 130(1)-(*n*), the models 132(1)-(*n*), the representations 134(1)-(*n*), the configuration store 140, and the sanitized configuration 17 411578-US-NP (037834.01348) information 142(1)-(*n*), and the processor 402 may execute the parser module 114, the formatting module 116, the representation generation module 118, the filter module 120, and the API 122. An example of memory 404 may include, but is not limited to, a type of memory usable by a computer, such as random access memory (RAM), read only memory (ROM), tapes, magnetic discs, optical discs, volatile memory, non-volatile memory, and any combination thereof. In an example, the memory 404 may store local versions of applications being executed by processor 402.

The example computing device 400 may include a communications component 410 that provides for establishing and maintaining communications with one or more parties utilizing hardware, software, and services as described herein. The communications component 410 may carry communications between components on the computing device 400, as well as between the computing device 400 and external devices, such as devices located across a communications network and/or devices serially or locally connected to the computing device 400. For example, the communications component 410 may include one or more buses, and may further include transmit chain components and receive chain components associated with a transmitter and receiver, respectively, operable for interfacing with external devices.

The example computing device 400 may include a data store 412, which may be any suitable combination of hardware and/or software, that provides for mass storage of information, databases, and programs employed in connection with implementations described herein. For example, the data store 412 may be a data repository for the operating system 406 and/or the applications 408.

The example computing device 400 may include a user interface component 414 operable to receive inputs from a user of the computing device 400 and further operable to generate outputs for presentation to the user. The user interface component 414 may include one or more input devices, including but not limited to a keyboard, a number pad, a mouse, a touch-sensitive display (e.g., display 416), a digitizer, a navigation key, a function key, a microphone, a voice recognition component, any other mechanism capable of receiving an input from a user, or any combination thereof. Further, the user interface component 414 may include one or more output devices, including but not limited to a display (e.g., display 416), a speaker, a haptic feedback mechanism, a printer, any other mechanism capable of presenting an output to a user, or any combination thereof.

In an implementation, the user interface component 414 may transmit and/or receive messages corresponding to the operation of the operating system 406 and/or the applications 408. In addition, the processor 402 executes the operating system 406 and/or the applications 408, and the memory 404 or the data store 412 may store them.

Further, one or more of the subcomponents of the network information platform 102, the parser module 114, the formatting module 116, the representation generation module 118, the filter module 120, and the API 122, may be implemented in one or more of the processor 402, the applications 408, the operating system 406, and/or the user interface component 414 such that the subcomponents of the network information platform 102, the parser module 114, the formatting module 116, the representation generation module 118, the filter module 120, and the API 122 are spread out between the components/subcomponents of the computing device 400.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Non-transitory computer-readable media excludes transitory signals. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
    receiving first device information from a network device of a network, the first device information including configuration information or state information in a vendor specific format;
    parsing, via a template associated with the vendor specific format, the first device information to generate parsed device information;
    generating, based on a vendor-agnostic model and the parsed device information, second device information in a vendor-agnostic format;
    generating a network representation including the second device information; and
    dynamically generating an application programming interface (API) for accessing the network representation of the second device information via an API request.

2. The method of claim 1, further comprising:
    receiving the API request from a client device, the API request including a resource identifier identifying a model resource associated with the network device or the network;
    identifying the second device information within the network representation based on the resource identifier; and
    transmitting an API response to the client device, the API response including the configuration information or the state information.

3. The method of claim 1, wherein receiving the first device information from the network device of the network comprises receiving command line interface (CLI) output from the network device.

4. The method of claim 1, wherein generating the network representation including the second device information comprises:
  identifying a portion of the second device information that has not been represented within the network representation; and
  updating the network representation to include the portion of the second device information.

5. The method of claim 1, wherein generating the network representation including the second device information comprises:
  updating or generating a graph representation of the network, the graph representation including one or more graph nodes or graph edges corresponding to the configuration information or the state information.

6. The method of claim 1, wherein the API is a representational state transfer (REST) API, and the API request is a hypertext transfer protocol get request.

7. The method of claim 1, wherein the network device is a layer 2 device or layer 3 device.

8. A non-transitory computer-readable device having instructions thereon that, when executed by at least one computing device, cause the at least one computing device to perform operations comprising:
  receiving first device information from a network device of a network, the first device information including configuration information or state information in a vendor specific format;
  parsing, via a template associated with the vendor specific format, the first device information to generate parsed device information;
  generating, based on a vendor-agnostic model and the parsed device information, second device information in a vendor-agnostic format;
  generating a network representation including the second device information; and
  dynamically generating an application programming interface (API) for accessing the network representation of the second device information via an API request.

9. The non-transitory computer-readable device of claim 8, wherein the instructions thereon cause the at least one computing device to perform operations further comprising:
  receiving the API request from a client device, the API request including a resource identifier identifying a model resource associated with the network device or the network;
  identifying the second device information within the network representation based on the resource identifier; and
  transmitting an API response to the client device, the API response including the configuration information or the state information.

10. The non-transitory computer-readable device of claim 8, wherein receiving the first device information from the network device of the network comprises receiving command line interface (CLI) output from the network device.

11. The non-transitory computer-readable device of claim 8, wherein generating the network representation including the second device information comprises:
  identifying a portion of the second device information that has not been represented within the network representation; and
  updating the network representation to include the portion of the second device information.

12. The non-transitory computer-readable device of claim 8, wherein generating the network representation including the second device information comprises:
  updating or generating a graph representation of the network, the graph representation including one or more graph nodes or graph edges corresponding to the configuration information or the state information.

13. The non-transitory computer-readable device of claim 8, wherein the API is a representational state transfer (REST) API, and the API request is a hypertext transfer protocol get request.

14. The non-transitory computer-readable device of claim 8, wherein the network device is a layer 2 device or layer 3 device.

15. A system comprising:
  a memory storing instructions thereon; and
  at least one processor coupled with the memory and configured by the instructions to:
    receive first device information from a network device of a network, the first device information including configuration information or state information in a vendor specific format;
    parse, via a template associated with the vendor specific format, the first device information to generate parsed device information;
    generate, based on a vendor-agnostic model and the parsed device information, second device information in a vendor-agnostic format;
    generate a network representation including the second device information; and
    dynamically generate an application programming interface (API) for accessing the network representation of the second device information via an API request.

16. The system of claim 15, wherein the at least one processor is further configured by the instructions to:
  receive the API request from a client device, the API request including a resource identifier identifying a model resource associated with the network device or the network;
  identify the second device information within the network representation based on the resource identifier; and
  transmit an API response to the client device, the API response including the configuration information or the state information.

17. The system of claim 15, wherein to receive the first device information from the network device of the network, the at least one processor is further configured by the instructions to receive command line interface (CLI) output from the network device.

18. The system of claim 15, wherein to generate the network representation including the second device information, the at least one processor is further configured by the instructions to:
  identify a portion of the second device information that has not been represented within the network representation; and
  update the network representation to include the portion of the second device information.

19. The system of claim 15, wherein to generate the network representation including the second device information, the at least one processor is further configured by the instructions to:
  update or generate a graph representation of the network, the graph representation including one or more graph nodes or graph edges corresponding to the configuration information or the state information.

20. The system of claim 15, wherein the network device is a layer 2 device or layer 3 device.

* * * * *